(12) United States Patent
Akita et al.

(10) Patent No.: US 8,630,594 B2
(45) Date of Patent: Jan. 14, 2014

(54) WIRELESS COMMUNICATION APPARATUS (75) Inventors: Koji Akita, Yokohama (JP); Tomoya Tandai, Kawasaki (JP); Takahiro Kobayashi, Kawasaki (JP); Takeshi Tomizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 13/240,399

(22) Filed: Sep. 22, 2011

(65) Prior Publication Data
US 2012/0129471 A1 May 24, 2012

(30) Foreign Application Priority Data
Nov. 19, 2010 (JP) ................................ 2010-259445

(51) Int. Cl.
*H04B 1/44* (2006.01)
(52) U.S. Cl.
USPC ...... 455/78; 455/552.1; 455/41.2; 455/67.13; 455/574; 455/343.1; 455/434; 370/311; 370/331; 370/514
(58) Field of Classification Search
USPC ............ 455/78, 41.2, 552.1, 67.13, 574, 455, 455/343.1, 434; 370/311, 514, 331
See application file for complete search history.

(56) References Cited

U.S. PATENT DOCUMENTS

| 7,185,256 | B2 * | 2/2007 | Miki et al. ..................... 714/751 |
| 7,280,504 | B2 * | 10/2007 | Sato ................................ 370/330 |
| 7,391,759 | B2 * | 6/2008 | Wallace et al. ................ 370/350 |
| 7,606,335 | B2 * | 10/2009 | Kloper et al. .................. 375/340 |
| 7,653,166 | B2 * | 1/2010 | Wagner et al. ................. 375/354 |
| 7,948,925 | B2 * | 5/2011 | Miyabayashi et al. ........ 370/302 |
| 8,116,398 | B2 * | 2/2012 | Sakata et al. .................. 375/267 |
| 8,149,879 | B2 * | 4/2012 | Rogerson et al. ............. 370/478 |
| 8,175,539 | B2 * | 5/2012 | Diener et al. .................... 455/69 |
| 8,175,558 | B2 * | 5/2012 | Akita et al. .................... 455/132 |
| 8,184,729 | B2 * | 5/2012 | Terabe et al. ................. 375/260 |
| 8,189,556 | B2 * | 5/2012 | Lee et al. ....................... 370/349 |
| 8,310,915 | B2 * | 11/2012 | Akita ............................. 370/203 |
| 8,315,583 | B2 * | 11/2012 | Stelliga et al. ................. 455/296 |
| 8,335,170 | B2 * | 12/2012 | Cordeiro ....................... 370/254 |
| 2007/0287418 | A1 * | 12/2007 | Reddy ............................ 455/410 |
| 2009/0040971 | A1 * | 2/2009 | Alicot et al. ................... 370/329 |
| 2011/0201267 | A1 * | 8/2011 | Synnergren et al. ......... 455/3.01 |
| 2011/0300887 | A1 * | 12/2011 | Osterling ....................... 455/507 |
| 2012/0063301 | A1 * | 3/2012 | Schel ............................. 370/225 |

FOREIGN PATENT DOCUMENTS

| JP | 2000-115852 A | 4/2000 |
| JP | 2000-228647 A | 8/2000 |
| JP | 2007-202134 A | 8/2007 |

OTHER PUBLICATIONS

Japanese Office Action dated Oct. 2, 2012 (and English translation thereof) in counterpart Japanese Application No. 2010-259445.

* cited by examiner

*Primary Examiner* — Marceau Milord
(74) *Attorney, Agent, or Firm* — Holtz, Holtz, Goodman & Chick, PC (57) ABSTRACT

According to one embodiment, a wireless communication apparatus includes a wireless unit and a control unit. The wireless unit is configured to set, for each period, a transmit state including a first period for transmitting a connection request to establish connection or a receive state including a second period for receiving a connection request and to transmit or receive a signal, both lengths of the first period and the second period being equal. The control unit is configured to control the wireless unit to operate in one of a transmit mode, a receive mode and a transceive mode. The control unit causes the wireless unit to operate in the receive mode or the transceive mode before a trigger signal is externally input, and to operate in the transmit mode if the trigger signal is input.

9 Claims, 11 Drawing Sheets

F I G. 29 ations.

WIRELESS COMMUNICATION APPARATUS

CROSS-REFERENCE TO RELATED APPLICATIONS

This application is based upon and claims the benefit of priority from prior Japanese Patent Application No. 2010-259445, filed Nov. 19, 2010, the entire contents of which are incorporated herein by reference.

FIELD

Embodiments described herein relate generally to a wireless communication apparatus.

BACKGROUND

A method for connection processing between two wireless communication apparatuses exists whereby one the apparatuses intermittently transmits a connection request, and another receives the connection request intermittently.

DETAILED DESCRIPTION

A connection request between wireless communication apparatuses is intermittently transmitted. If the interval of intermittently transmission is long, it takes long time until the connection request is successfully received, and it takes longer to connect. If the interval of transmission is shorter, the request is transmitted a large number of times, and the wireless communication apparatus demands high power. That is, a problem of large energy consumption arises if connection is attempted for a short time.

In general, according to one embodiment, a wireless communication apparatus includes a wireless unit and a control unit. The wireless unit is configured to set a transmit state or a receive state for each period and to transmit or receive a signal, the transmit state including a first period for transmitting a connection request to establish connection, the receive state including a second period for receiving a connection request, and both lengths of the first period and the second period being equal. The control unit is configured to control the wireless unit to operate in one of a transmit mode, a receive mode and a transceive mode, the transmit mode being a mode in which the transmit state is maintained for a plurality of first periods, the receive mode being a mode in which the receive state is maintained for a plurality of second periods, and the transceive mode being a mode in which the transmit state and the receive state are switched. The control unit causes the wireless unit to operate in the receive mode or the transceive mode before a trigger signal is externally input, and to operate in the transmit mode if the trigger signal is input.

In the following, the wireless communication apparatus according to the present embodiments will be described in details with reference to the drawings. In the embodiments described below, the same reference number will be used to denote similar-operation elements, and a repetitive description of such elements will be omitted.

First Embodiment

Figure 1:
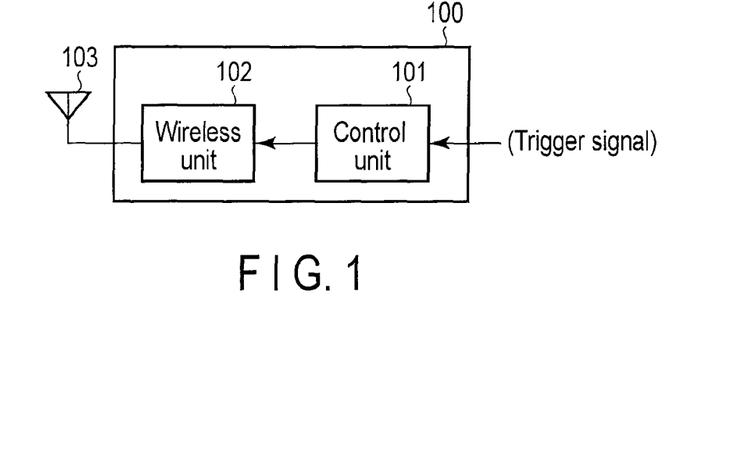
FIG. 1 is an exemplary block diagram illustrating a wireless communication apparatus.

A description of the wireless communication apparatus according to the first embodiment with reference to FIG. 1 follows.

A wireless communication apparatus 100 according to the first embodiment includes a control unit 101 and a wireless unit 102.

The control unit 101 controls a switching of modes of the wireless unit 102 described below between a receive mode, a transmit mode and a transceive mode. The transmit mode is a mode where the transmit state is maintained for a plurality of periods. The receive mode is a mode where the receive state is maintained for a plurality of periods. The transceive mode is a mode where the transmit state and the receive state are switched. If the control unit 101 externally receives a trigger signal, the control unit 101 controls the wireless unit 102 to operate in the transmit mode. The trigger signal is input to switch modes to the transmit mode. The three modes will be explained later with reference to FIGS. 5 to 9.

For example, the trigger signal may be a signal input by pressing a button when a user wants to initiate communication, a signal output from an electronic device to be communicated with, or a signal obtained by converting these signals.

The wireless unit 102 is controlled by the control unit 101 to switch states between a transmit state in which the wireless communication apparatus 100 can transmit a connection request, and a receive state in which the wireless communication apparatus 100 can receive a connection request. The connection request is transmitted to establish connection between the wireless communication apparatus 100 and another wireless communication apparatus before data communication is initiated. The transmit state includes a period for transmitting a connection request, and the receive state includes a period for receiving a connection request. A period for the transmit state is a first period, and a period for the receive state is a second period. The first period and the second period are different from each other, but are equal in length. The transmit state and the receive state will be explained later in detail with reference to FIGS. 16 to 25.

An antenna 103 is connected to the wireless unit 102 and transmits or receives the connection request. A generally used antenna can be used as the antenna 103, and therefore, an explanation of the antenna 103 will be omitted.

Figure 2:
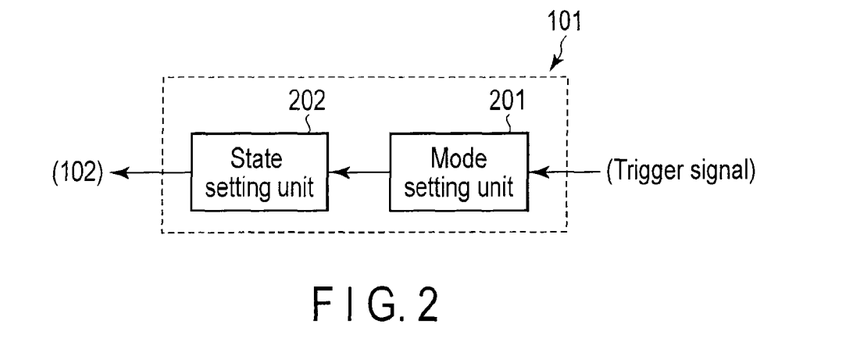
FIG. 2 is an exemplary block diagram illustrating the control unit according to the first embodiment.

Next, the control unit 101 will be explained with reference to FIG. 2.

The control unit 101 includes a mode setting unit 201 and a state setting unit 202. The mode setting unit 201 generates a mode setting signal to set the wireless communication apparatus to operate in one of the receive mode, the transmit mode and the transceive mode. The mode setting unit 201 generates the mode setting signal for switching to the transmit mode when an externally input trigger signal is received. The state setting unit 202 receives the mode setting signal and generates a control signal to switch operational states of the wireless unit 102 based on the received mode setting signal.

Figure 3:
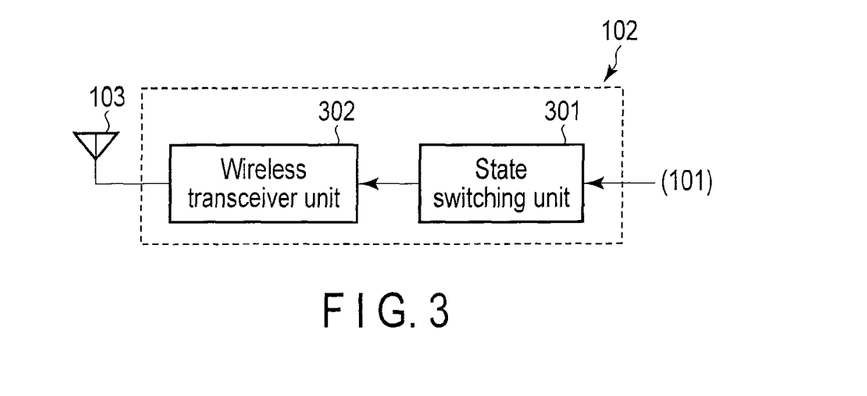
FIG. 3 is an exemplary block diagram illustrating the wireless unit according to the first embodiment.

The wireless unit 102 will be explained with reference to FIG. 3.

The wireless unit 102 includes a state switching unit 301 and a wireless transceiver unit 302.

The state switching unit 301 receives the control signal from the state setting unit 202, and generates a command signal to switch the operational states of the wireless transceiver unit 302 between the transmit state and the receive state for each period based on the received control signal.

The wireless transceiver unit 302 receives the command signal from the state switching unit 301. The wireless transceiver unit 302 transmits the connection request when operating in the transmit state, and receives the connection request when operating in the receive state, based on the command signal.

The transition of modes will be explained with reference to FIG. 4.

Figure 4:
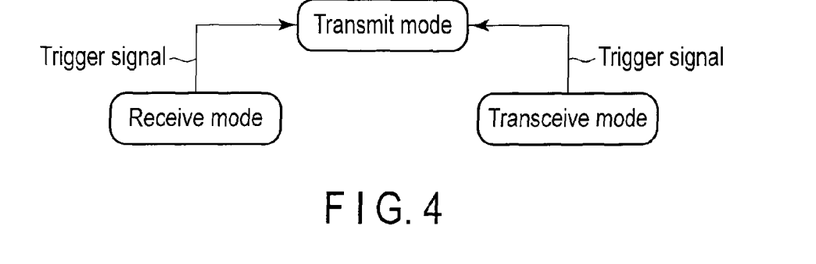
FIG. 4 illustrates the transition of mode according to the first embodiment.

As shown in FIG. 4, the wireless communication apparatus 100 according to the first embodiment operates in the receive mode or the transceive mode before the trigger signal is input. If the trigger signal is input to the wireless communication apparatus 100, the wireless communication apparatus 100 switches from the receive mode or the transceive mode to the transmit mode. Generally, the power demand for transmission is greater than that for reception, and accordingly, the power demand in the transmit state is usually greater than that in the receive state. Even if the power for reception is greater, if the period for actual transmission in the transmit state is much larger than the period for actual reception in the receive state, the energy consumption for the transmit state will be greater than that for the receive state.

As stated above, in the case where the energy consumption for the transmit state is larger than that for the receive state, the energy consumptions for the modes according to the first embodiment are increased in the order corresponding to the receive mode, the transceive mode, and the transmit mode.

Since the wireless communication apparatus 100 according to the first embodiment operates in the receive mode or the transceive mode before the trigger signal is input, the energy consumption can be decreased in comparison with the conventional wireless communication apparatus which operates only in the transmit mode which needs a large power. In addition, since the connection request is transmitted in the transceive mode, if at least one of two wireless communication apparatuses which face each other is in the transceive mode, connection can be established even without inputting the trigger signal. This can reduce connection time.

The operational states in each mode will be explained with reference to FIGS. 5 to 9.

Figure 5:
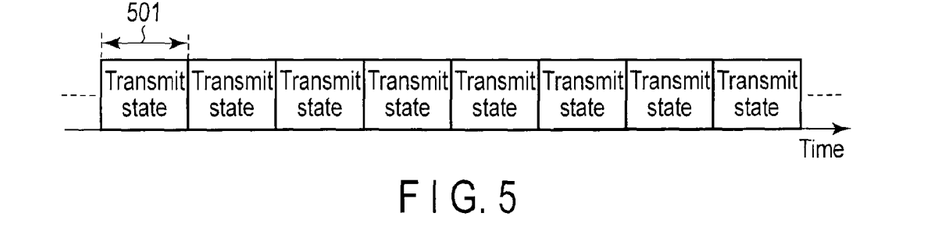
FIG. 5 illustrates an example of the transmit mode.

FIG. 5 illustrates the operational states of the transmit mode. In the transmit mode, the transmit state is continued for a plurality of periods 501, as shown in FIG. 5.

Figure 6:
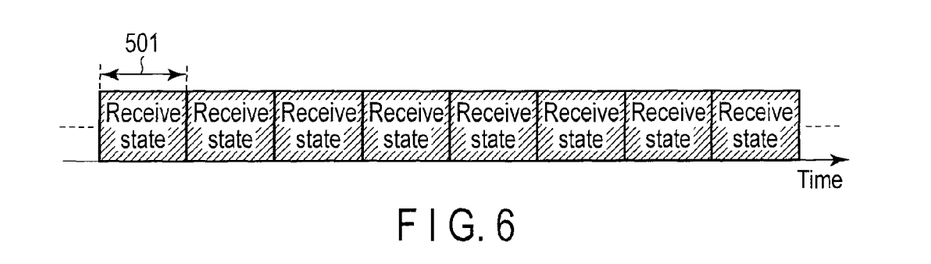
FIG. 6 illustrates an example of the receive mode.

FIG. 6 illustrates the operational state of the receive mode. In the receive mode, the receive state is continued for a plurality of periods 501.

Figure 7:
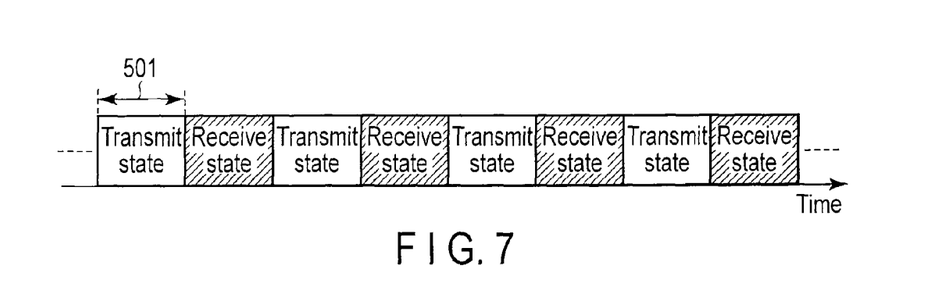
FIG. 7 illustrates the first example of the transceive mode.
Figure 8:
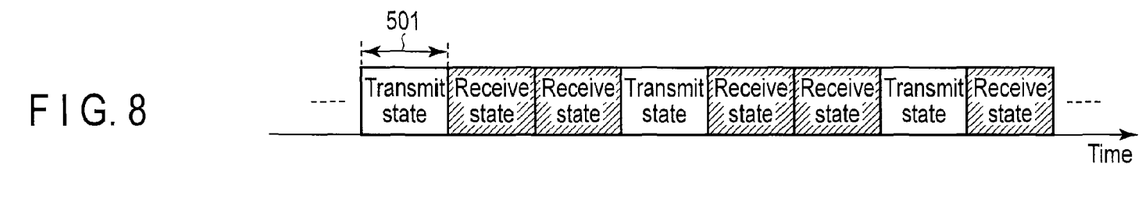
FIG. 8 illustrates the second example of the transceive mode.
Figure 9:
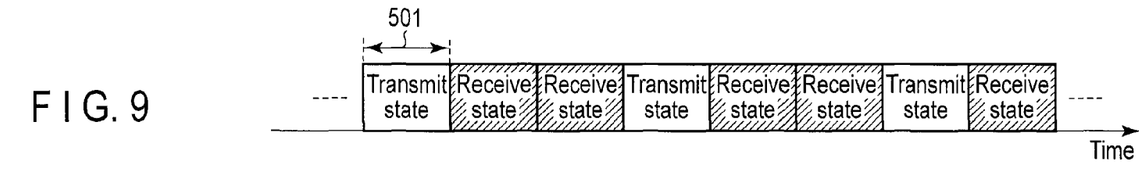
FIG. 9 illustrates the third example of the transceive mode.

FIGS. 7 to 9 illustrate the operational state of the transceive mode. The transceive mode is a mode where the transmit state and the receive state are switched for each period 501. The states can be switched in any ways. They can be switched alternately as shown in FIG. 7, and can be switched in the manner that the receive state is maintained for two periods after the one period in the transmit state, as shown in FIG. 8. In addition, they can be randomly switched as shown in FIG. 9.

The case where the wireless communication apparatuses 100 each operating in one of the above modes face each other will be explained with reference to FIGS. 10 to 13.

Assume that communication is established between two wireless communication apparatuses 100 facing each other. In FIGS. 10 to 13, the state transition over time for one wireless communication apparatus 100 is shown as sequence A, and that for the other wireless communication apparatus 100 is shown as sequence B. If one of the wireless communication apparatuses 100 receives the connection request, it is considered that connection is established, and these apparatuses are changed to a communication mode (not shown) to initiate data communication.

Figure 10:
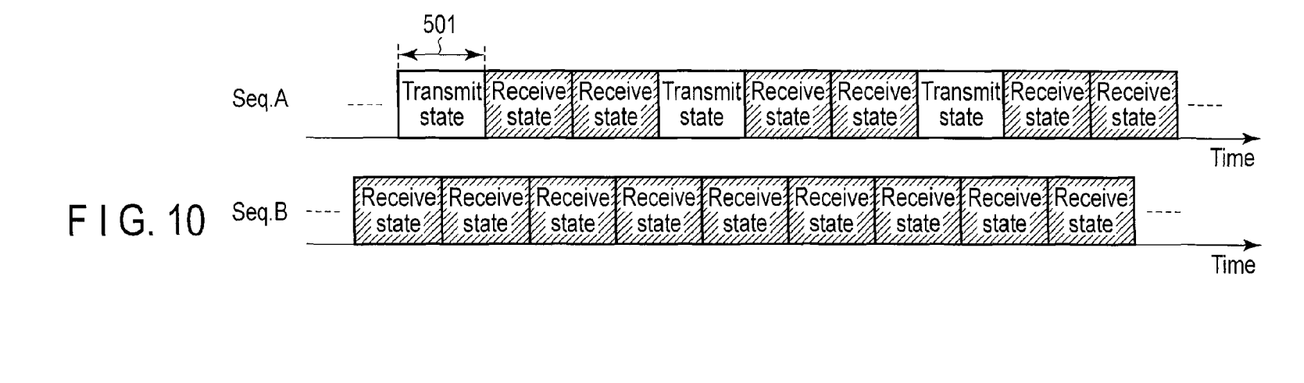
FIG. 10 illustrates an example of the case where the wireless communication apparatuses operating in the transceive mode and the receive mode face each other.

Before the trigger signal is input to the wireless communication apparatus 100, the connection is established if at least one of the wireless communication apparatuses 100 is in the transceive mode. For example, as shown in FIG. 10, if one of the apparatuses is in the transceive mode (Sequence A), and the other is in the receive mode (Sequence B), the connection request transmitted by one of the wireless communication apparatuses 100 which is in the transmit state of the transceive mode is received anytime by the other wireless communication apparatus 100.

Figure 11:
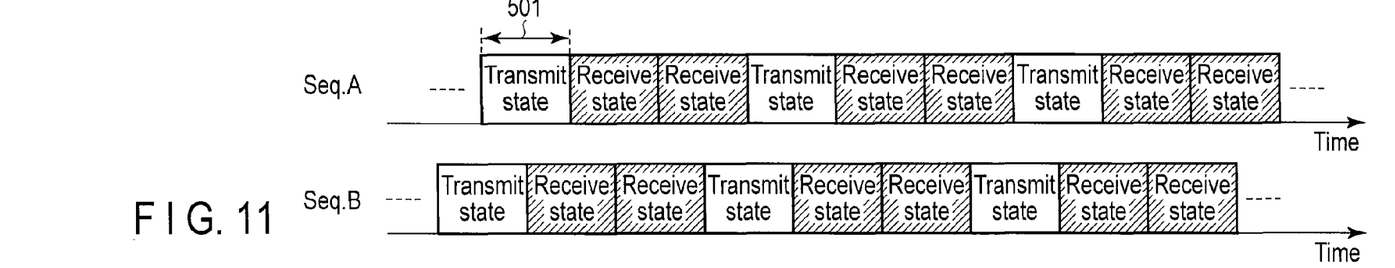
FIG. 11 illustrates an example of the case where both wireless communication apparatuses operating in the transceive mode face each other.

As shown in FIG. 11, if both wireless communication apparatuses 100 are in the transceive mode, the connection request transmitted by one of the wireless communication apparatuses 100 is received by the other, and connection is established. If both of the wireless communication apparatuses 100 are in the transceive mode, and one wireless communication apparatus 100 switches to transmit state at the exact instant the other wireless communication apparatuses 100 switches to the transmit state, that is, the timings for switching between the transmit state and the receive state are substantially the same, the connection request transmitted from the one wireless communication apparatus 100 to the other may not be received. However, this is a very rare occurrence since there is usually a time lag between transceive switching of the two wireless communication apparatuses 100.

For the case where transceive switching of the two wireless communication apparatuses 100 is made at the exact instant, if the transmit and receive states are randomly switched as shown in FIG. 9, connection can be established when one transitions into the transmit state and the other transitions into the receive state.

Figure 12:
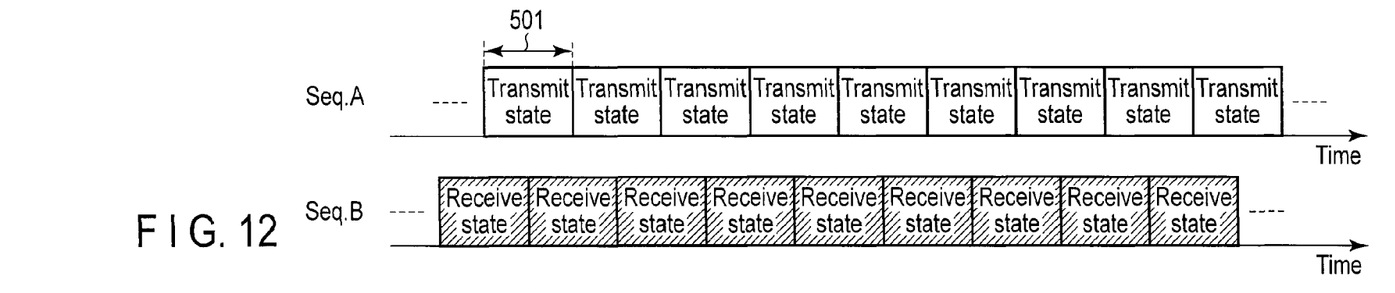
FIG. 12 illustrates an example of the case where the wireless communication apparatuses operating in the transmit mode and the receive mode face each other.
Figure 13:
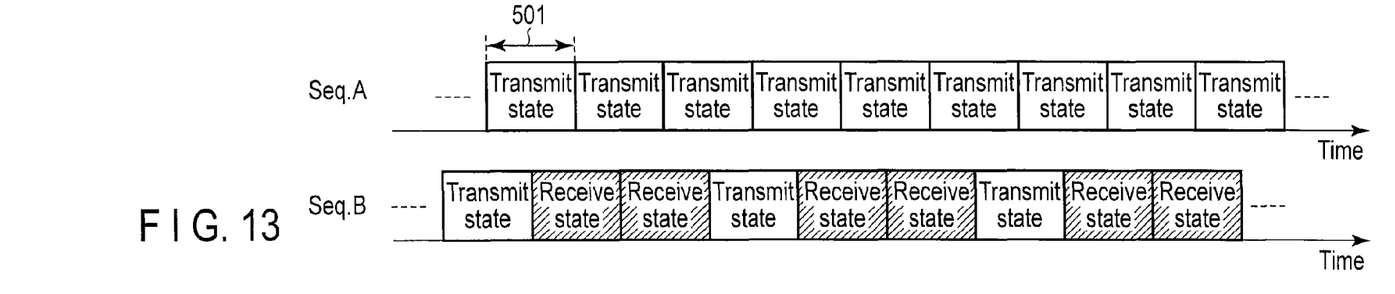
FIG. 13 illustrates an example of the case where the wireless communication apparatuses operating in the transmit mode and the transceive mode face each other.

The wireless communication apparatus 100 which has received the trigger signal transitions into the transmit mode. As shown in FIGS. 12 and 13, the wireless communication apparatus 100 which has not received the trigger signal (Sequence B in FIGS. 12 and 13) can receive the connection request when it is in the receive state of the receive mode or the transceive mode, and can establish connection.

Switching between the transmit state and the receive state in the transceive mode will be explained with reference to FIGS. 14 and 15.

Figure 14:
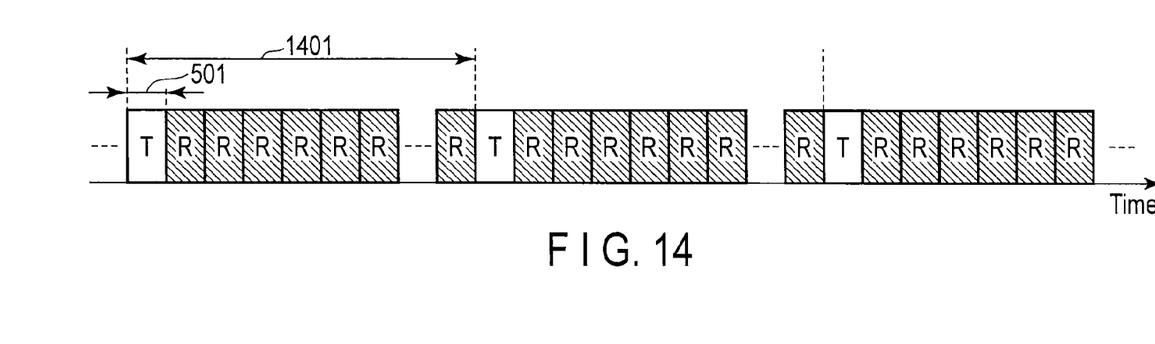
FIG. 14 illustrates an example of switching between the transmit state and the receive state in the transceive mode.

FIG. 14 illustrates an example of state transition of the transceive mode. The transmit state or the receive state is set for each period 501. During the third period 1401 which has an integer multiple of period 501, at least one of the periods 501 should be the transmit state. Concretely, as shown in FIG. 14, the third period 1401 in which the first period 501 is the transmit state, and the other periods 501 are the receive state is repeated. That is, if the control unit 101 sets one of the periods 501 in the third period 1401 to be the transmit state, the connection request is transmitted at least once during the third period 1401.

Figure 15:
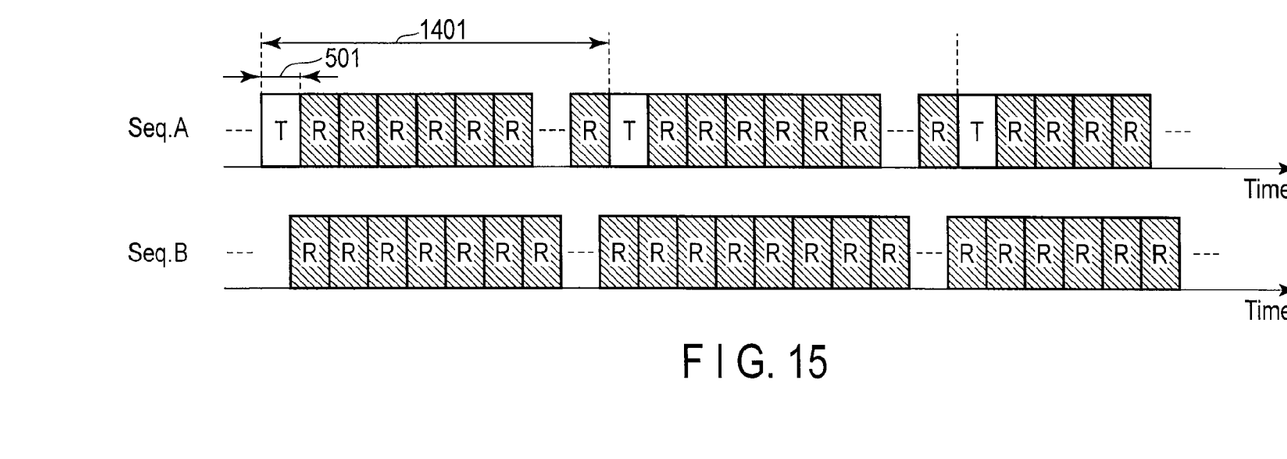
FIG. 15 illustrates another example of the case where the wireless communication apparatuses operating in the transceive mode and the receive mode face each other.

FIG. 15 illustrates an example case where one wireless communication apparatus 100 operates in the transceive mode, and the other wireless communication apparatus 100 operates in the receive mode. Even if one wireless communication apparatus 100 operates in the receive mode, connection can be established within the third period 1401.

The exemplary operation in the transmit state and the receive state will be explained with reference to FIGS. 16 and 17.

Figure 16:
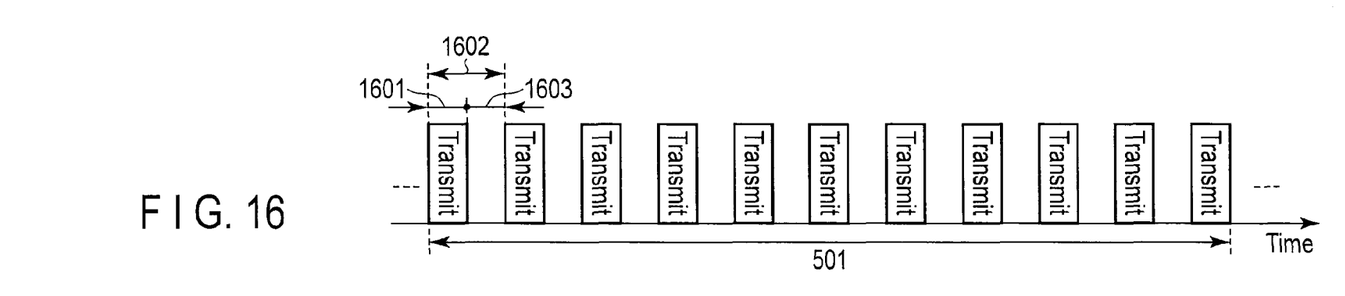
FIG. 16 illustrates an example of the transmit state.

FIG. 16 illustrates an example of the transmit state in the period 501. It is desirable in terms of the energy consumption to intermittently transmit the connection request instead of continuously transmitting during the period 501. For example, the connection request is continuously transmitted for fourth period 1601 which is shorter than the period 501 and is not transmitted during period 1603. The connection request is transmitted once during fifth period 1602 which is shorter than the period 501 and longer than the fourth period 1601. The fifth period 1602 includes the fourth period 1601 and the period 1603. In FIG. 16, the connection requests are transmitted every fifth period 1602, and eleven connection requests are transmitted during the period 501.

Figure 17:
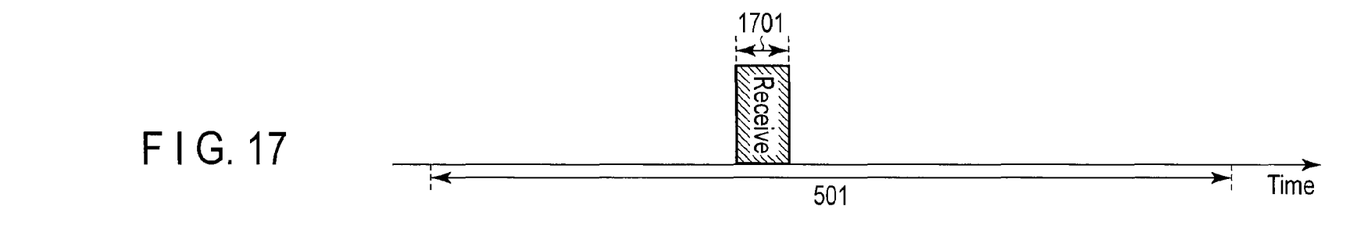
FIG. 17 illustrates an example of the receive state.
Figure 18:
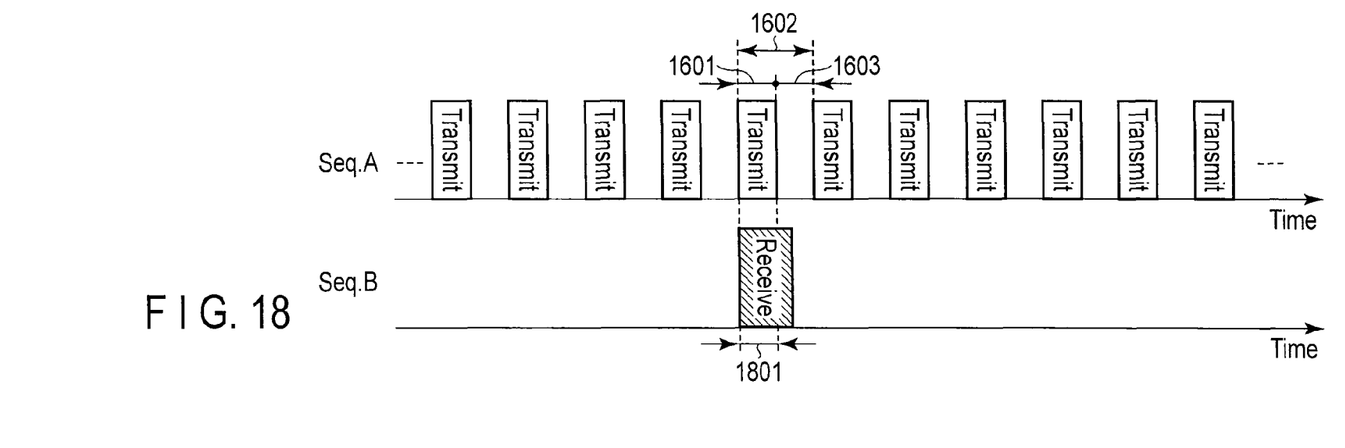
FIG. 18 illustrates the first example of the case where the wireless communication apparatus in the transmit state and the wireless communication apparatus in the receive state face each other.
Figure 19:
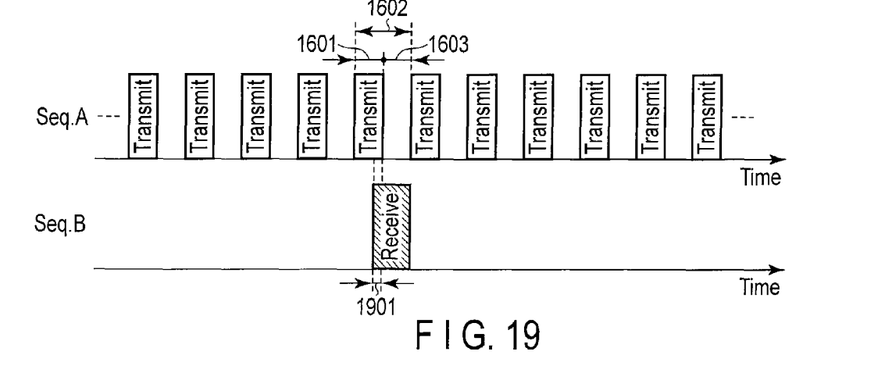
FIG. 19 illustrates the second example of the case where the wireless communication apparatus in the transmit state and the wireless communication apparatus in the receive state face each other.
Figure 20:
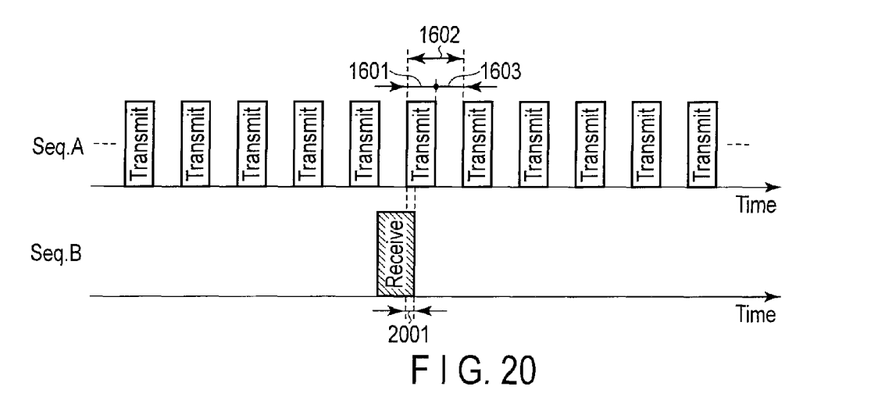
FIG. 20 illustrates the third example of the case where the wireless communication apparatus in the transmit state and the wireless communication apparatus in the receive state face each other.
Figure 21:
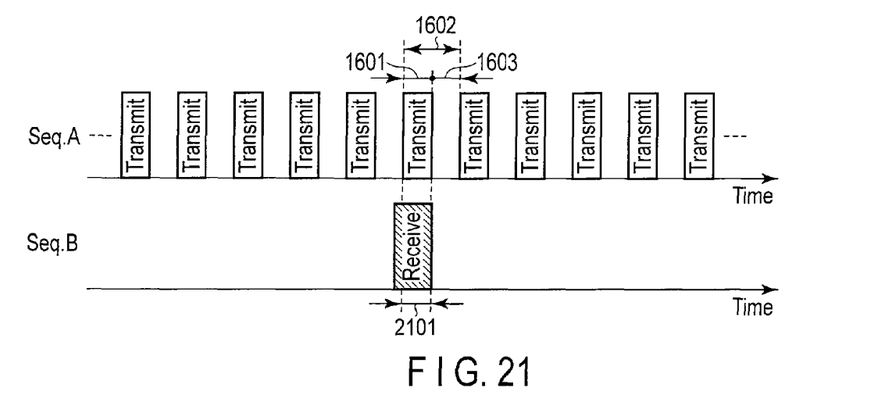
FIG. 21 illustrates the fourth example of the case where the wireless communication apparatus in the transmit state and the wireless communication apparatus in the receive state face each other.

FIG. 17 illustrates an example of the receive state in the period 501. Since energy consumption becomes large if the connection request is continuously received during the period 501, the connection request is received once during the period 501. For example, FIG. 17 illustrates that the connection request is received once during the period 501. If sixth period 1701 in which the connection request is received is shorter than or equal to the period in which the connection request is not transmitted in the transmit state, the connection request may not be received. To avoid this, it is desirable that the sixth period 1701 is longer than the period 1603 obtained by subtracting the fourth period 1601 from the fifth period 1602.

An example of the receive state and the transmit state in the case where the sixth period 1701 is set longer than the period 1603 will be explained with reference to FIGS. 18 to 21.

Assume that one wireless communication apparatus 100 is in the transmit state, and the other wireless communication apparatus 100 is in the receive state. As shown in FIGS. 18 to 21, since the sixth period 1701 in which the connection request is received is longer than the period 1603 obtained by subtracting the fourth period 1601 from the fifth period 1602, the periods for reception and transmission overlap. Therefore, one wireless communication apparatus 100 can receive the connection request transmitted by the other during the periods 1801, 1901, 2001, and 2101 shown in FIGS. 18 to 21, and connection is established during these periods. That is, connection is established anytime.

An exemplary operation of the receive state will be explained with reference to FIGS. 22 to 25.

In the case where the receive state is set as shown in FIG. 17, if the wireless communication apparatus 100 to be connected is in the transmit mode in which the transmit state is maintained, the connection request can be received sometime. However, if the wireless communication apparatus 100 to be connected is in the transceive mode in which the transmit state and the receive state are switched, the period for receiving the connection request (sixth period) in the receive state should be carefully set.

Figure 22:
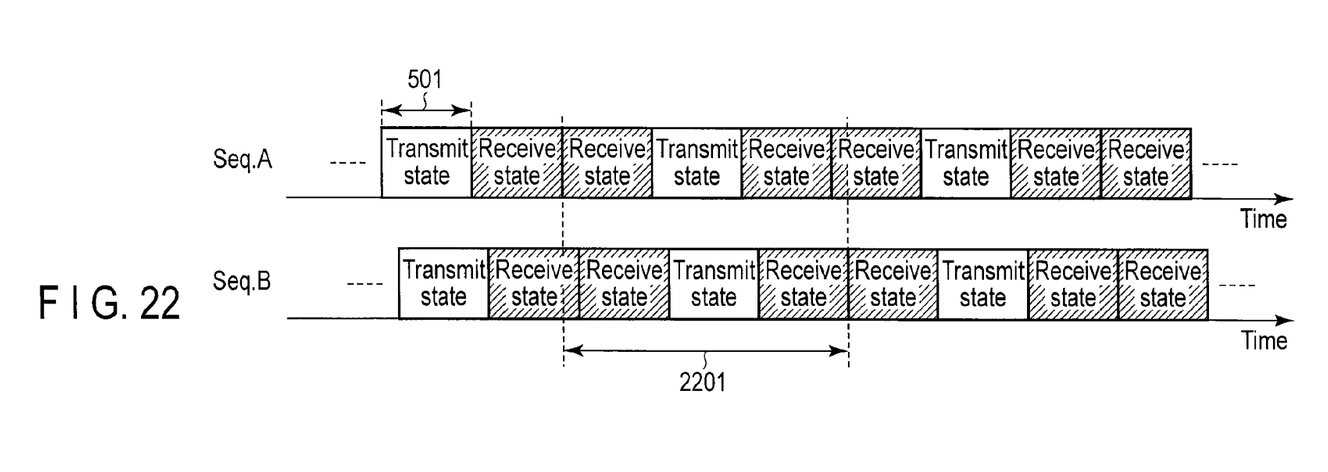
FIG. 22 illustrates a time lag of switching states of the wireless communication apparatuses operating in the transceive mode.

Concretely, as shown in FIG. 22, assume that both wireless communication apparatuses 100 operate in the transceive mode, and the timings for switching between the transmit state and the receive state are substantially the same.

Figure 23:
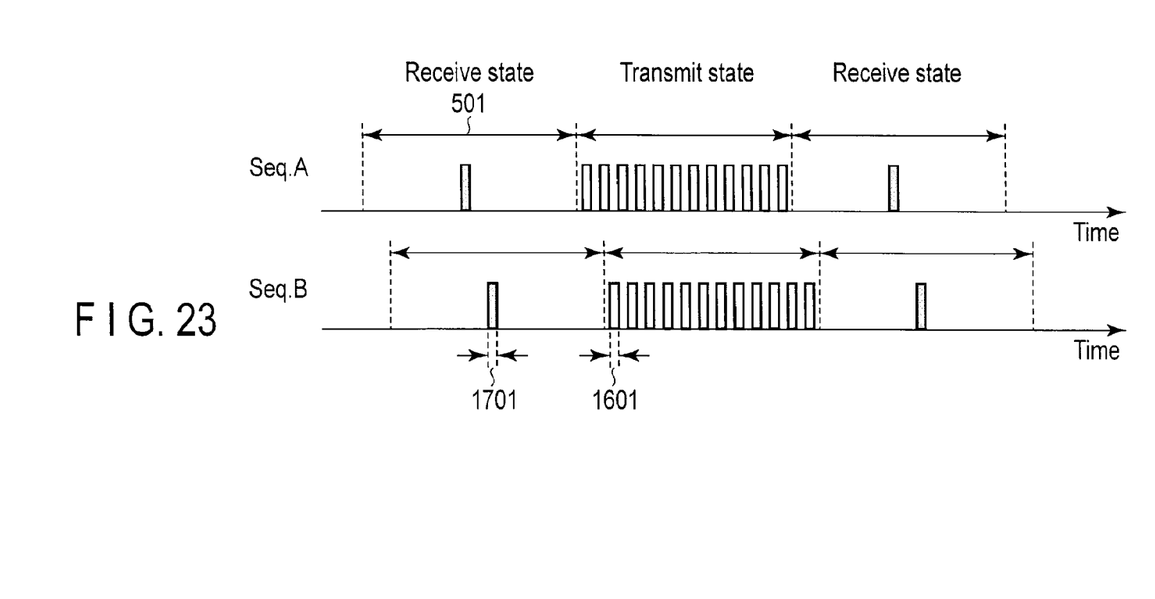
FIG. 23 illustrates the first example of reception timing in the receive state.

FIGS. 23 to 25 illustrate the period 2201 shown in FIG. 22 in the details. As shown in FIG. 23, if the sixth period 1701 is set in around the middle of the period 501 of the receive state, it is likely that the connection request cannot be received for the case where the timings for switching between the transmit state and the receive state of two wireless communication apparatuses 100 are substantially the same.

Figure 24:
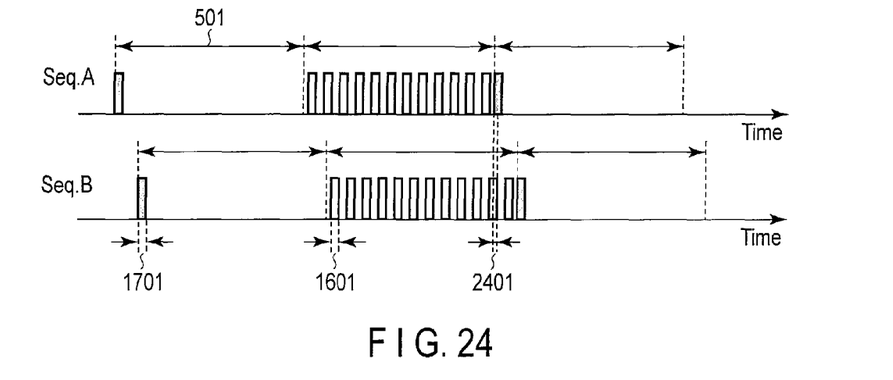
FIG. 24 illustrates the second example of reception timing in the receive state.
Figure 25:
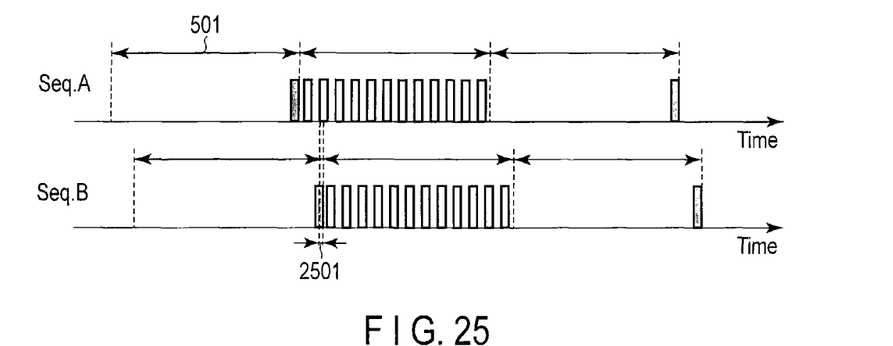
FIG. 25 illustrates the third example of reception timing in the receive state.

In this case, the sixth period 1701 should be set to be offset relative to the period 501. (The sixth period 1701 should not include the middle of the period 501.) It is desirable that the sixth period 1701 is set apart from the middle of the period 501. For example, as shown in FIG. 24, if the sixth period 1701 is set at the beginning of the period 501, the connection request can be receive in period 2401 even if the timings for switching between the transmit state and the receive state of two wireless communication apparatuses 100 are substantially the same. In the same way, as shown in FIG. 25, if the sixth period 1701 is set at the end of the period 501, the connection request can be receive in period 2501.

Therefore, even for the wireless communication apparatuses 100 both of which operate in the transceive mode and switch between the transmit state and the receive state at substantially the same timings, the connection request can be received when a time lag occurs, and occurrence of the situation that the connection request cannot be received can be reduced.

According to the first embodiment, the wireless communication apparatus operates in the transceive mode, since connection can be established regardless of whether the trigger signal is input or not, the time required for establishing connection can be shorter. In addition, the wireless communication apparatus 100 operates in the receive mode or the transceive mode before the trigger signal is input, and operates in the transmit mode if the trigger signal is input. This decreases energy consumption.

Second Embodiment

The second embodiment differs from the first embodiment in that after the wireless communication apparatus receives a trigger signal and switches into the transmit mode from the receive mode or transceive mode, the apparatus returns to the receive mode or transceive mode when a certain time has elapsed.

If one wireless communication apparatus remains the transmit mode for a certain time after the trigger signal is input, the other wireless communication apparatus to be communicated with may not be in the state which is capable of communicating. If the transmit mode is maintained under such a condition, the energy consumption is undesirably increased.

If the transmit mode is switched to the receive mode or transceive mode after a certain time has elapsed, the operating time of transmit mode is decreased, and the energy consumption can be reduced.

Figure 26:
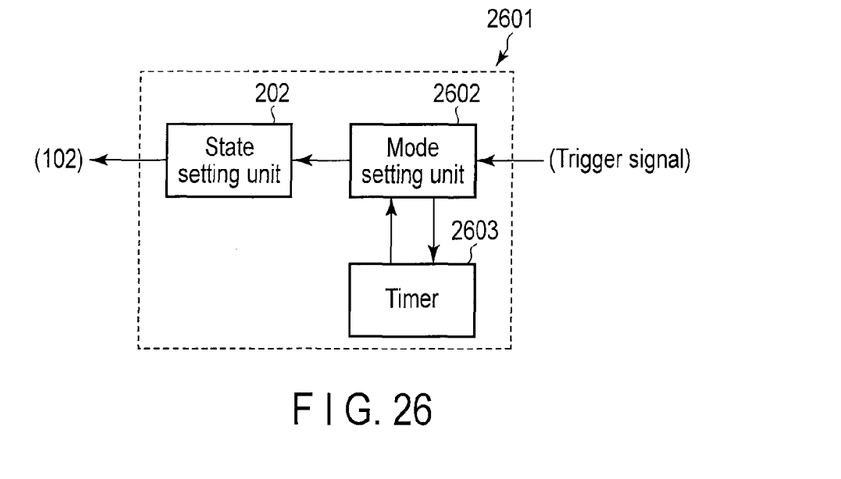
FIG. 26 is an exemplary block diagram illustrating the control unit according to the second embodiment.

The wireless communication apparatus according to the second embodiment will be explained with reference to FIG. 26. Since the wireless unit 102 has the same function as the first embodiment, the explanation will be omitted.

The control unit 2601 of the second embodiment includes a mode setting unit 2602, a state setting unit 202, and a timer 2603.

The mode setting unit 2602 performs substantially the same operation as the mode setting unit 201 of the first embodiment; however, it differs from the mode setting unit 201 in that the mode setting unit 2602 generates a mode setting signal to switch the mode to the receive mode or transceive mode if a notification signal indicating that a certain time has elapsed is received from the timer 2603.

The timer 2603 measures time elapsed from when the mode setting signal indicating to switch the mode to the transmit mode is received from the mode setting unit 2602, and generates the notification signal after a certain time has elapsed.

Figure 27:
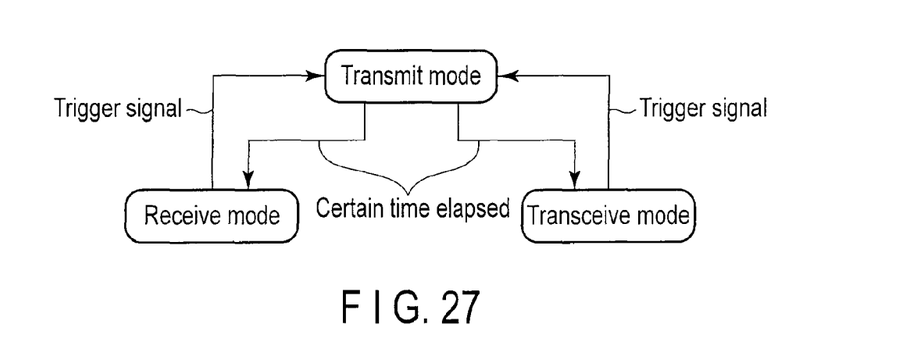
FIG. 27 illustrates the transition of mode according to the second embodiment.

The transition of modes according to the second embodiment will be explained with reference to FIG. 27.

When a certain time has elapsed after wireless communication apparatus has switched into the transmit mode, the wireless communication apparatus returns to the receive mode or the transceive mode whose energy consumption is lower.

According to the second embodiment, the transmit mode is switched to the receive mode or the transceive mode after a certain time has elapsed so that the energy consumption is reduced.

Third Embodiment

The third embodiment differs from the first and second embodiment in that the receive mode is switched to the transceive mode if a setting signal is input. For example, when both of two wireless communication apparatuses operate in the receive mode, they cannot start communication until a trigger signal is received. If a setting signal is externally input to switch from the receive mode to the transceive mode, the wireless communication apparatuses can establish connection even without receiving the trigger signal.

Figure 28:
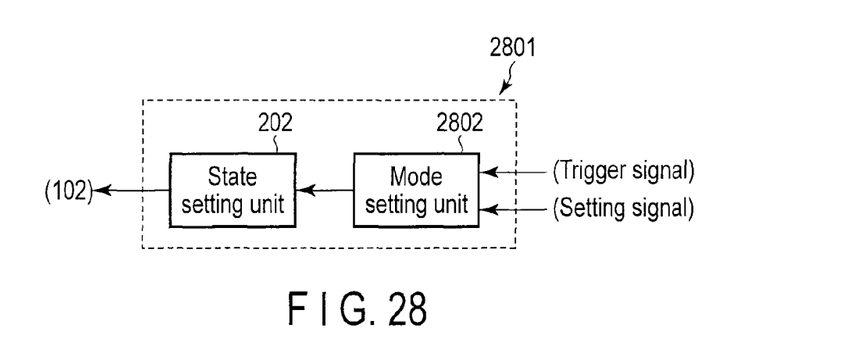
FIG. 28 is an exemplary block diagram illustrating the control unit according to the third embodiment.

The wireless communication apparatus according to the third embodiment will be explained with reference to FIG. 28. Since the wireless unit 102 has the same function as the first embodiment, the explanation will be omitted.

The control unit 2801 of the third embodiment includes a mode setting unit 2802 and a state setting unit 202.

The mode setting unit 2802 performs the same operation as the mode setting unit 201 of the first embodiment except it also generates a setting signal to switch to the transceive mode. The setting signal is set by an external hardware device or the like, and used to switch the mode to transceive mode. The setting signal is received at least once when the wireless communication apparatus is operating in the receive mode or before the wireless communication apparatus starts operation, i.e., at an initial setting, so as to switch to the transceive mode.

Figure 29:
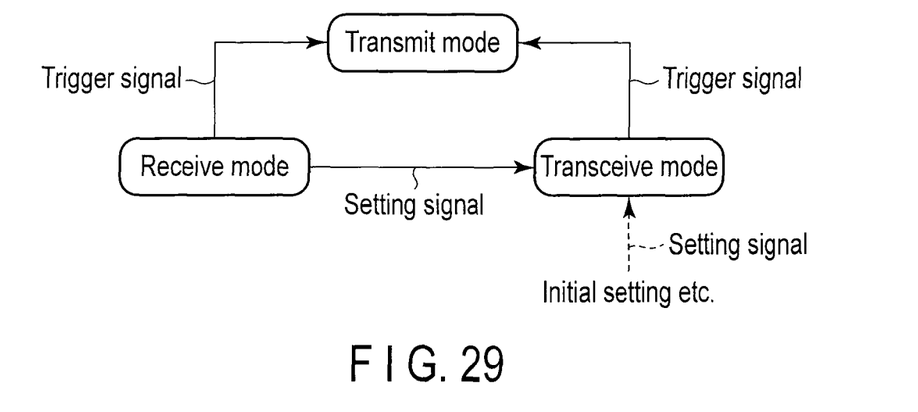
FIG. 29 illustrates the transition of mode according to the third embodiment.

The transition of modes will be explained with reference to FIG. 29.

When the wireless communication apparatus is operating in the receive mode, the mode is switched to the transmit mode if the trigger signal is received, and switched to the transceive mode if the setting signal is received. When the wireless communication apparatus is operating in the transceive mode, the mode is switched to the transmit mode if the trigger signal is received.

The mode transition according to the second embodiment can be combined to this mode transition. That is, the wireless communication apparatuses operating in the receive mode switches into the transceive mode if the setting signal is received, transitions again into the transmit mode if the trigger signal is received, and returns to the receive mode or the transceive mode after a certain time has elapsed. In such a case, a timer which has the same function as that of the second embodiment should be included in the wireless communication apparatus of the third embodiment.

According to the third embodiment, the receive mode is switched to the transceive mode when the setting signal is input. This realizes reception of the connection request to establish connection for initiating data communication without receiving a trigger signal.

Fourth Embodiment

In the fourth embodiment, the wireless communication apparatus 100 illustrated in FIG. 1 further includes an antenna 103. With the structure that the antenna can be integrally formed with the wireless communication apparatus 100, a small footprint wireless communication apparatus can be provided. In addition, the antenna 103 which is used both for transmission and reception processes can realize a small-sized wireless communication apparatus.

Fifth Embodiment

In the fifth embodiment, the wireless communication apparatus 100 illustrated in FIG. 1 further includes a buffer. This structure can realize retransmission or external output processing easily since the buffer stores transmitting data and receiving data.

Sixth Embodiment

In the sixth embodiment, the wireless communication apparatus of the fifth embodiment further includes a bus, a processor unit and an external interface unit. The processor unit and the external interface unit are connected to the buffer via the bus. The processor unit includes firmware. Such a wireless communication apparatus which includes the firmware can change the functions easily by rewriting the firmware.

Seventh Embodiment

In the seventh embodiment, the wireless communication apparatus 100 illustrated in FIG. 1 further includes a clock generation unit. The clock generation unit generates a clock and outputs it externally via an output terminal. The clock generated within the wireless communication apparatus is externally output to activate the host. This can realize operation in synchronism with between the host and the wireless communication apparatus.

Eighth Embodiment

In the eighth embodiment, the wireless communication apparatus 100 illustrated in FIG. 1 further includes a power source unit, a power control unit and a wireless power feeding unit. The power control unit is connected to the power source unit and the wireless power feeding unit, and selects one of the power source unit and the wireless power feeding unit to supply power to the wireless communication apparatus. Such a structure can realize low power operation by selectively using the power sources.

Ninth Embodiment

In the ninth embodiment, the wireless communication apparatus of the eighth embodiment further includes a near-field communications (NFC) transceiver unit. The NFC transceiver unit is connected to the power control unit and the control unit 101. This structure can facilitate an authentication processing and decrease energy consumption during waiting mode by controlling the power source by using a signal received in the NFC transceiver unit as a trigger.

Tenth Embodiment

In the tenth embodiment, the wireless communication apparatus of the eighth embodiment further includes a SIM card. The SIM card is connected to the control unit 101. This structure can facilitate authentication processing.

Eleventh Embodiment

In the eleventh embodiment, the wireless communication apparatus of the sixth embodiment further includes a moving picture compander unit. The moving picture compander unit is connected to the bus. This structure can facilitate transmission of compressed moving pictures and expansion of received compressed moving pictures.

Twelfth Embodiment

In the twelfth embodiment, the wireless communication apparatus 100 illustrated in FIG. 1 further includes an LED unit. The LED unit is connected to the control unit 101. With this structure, notification of the operational state of the wireless communication apparatus can be easily made to a user.

Thirteenth Embodiment

In the thirteenth embodiment, the wireless communication apparatus 100 illustrated in FIG. 1 further includes a vibrator. The vibrator is connected to the control unit 101. With this structure, notification of the operational state of the wireless communication apparatus can be easily made to a user.

Fourteenth Embodiment

In the fourteenth embodiment, the wireless communication apparatus 100 illustrated in FIG. 1 further includes a wireless LAN unit and a wireless switching unit. The wireless switching unit is connected to the control unit 101 and the wireless LAN unit, and switches communication via a wireless LAN and via the wireless unit 102. With this structure, communications via the wireless LAN and via the wireless unit 102 can be switched depending on the location and the situation.

Fifteenth Embodiment

In the fifteenth embodiment, the wireless communication apparatus of the fourteenth embodiment further includes a switch (SW). The switch is connected to the antenna 103, the wireless unit 102, the wireless switching unit and the wireless LAN unit. With this structure, communications via the wireless LAN and via the wireless unit 102 can be switched depending on the location and the situation by sharing the antenna by the wireless unit and the wireless LAN unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a wireless unit configured to set a transmit state or a receive state for each period and to transmit or receive a signal, the transmit state including a first period for transmitting a connection request to establish connection, the receive state including a second period for receiving a connection request, and both lengths of the first period and the second period being equal; and
a control unit configured to control the wireless unit to operate in one of a transmit mode, a receive mode and a transceive mode, the transmit mode being a mode in which the transmit state is maintained for a plurality of first periods, the receive mode being a mode in which the receive state is maintained for a plurality of second periods, and the transceive mode being a mode in which the transmit state and the receive state are switched,
wherein the control unit causes the wireless unit to operate in the receive mode or the transceive mode before a trigger signal is externally input, and to operate in the transmit mode if the trigger signal is input.

2. The apparatus according to claim 1, further comprising a timer configured to measure time that the wireless unit is operating in the transmit mode, and to generate a notification signal after a time has elapsed, wherein the control unit controls the wireless unit to operate in the receive mode or the transceive mode if the notification signal is received.

3. The apparatus according to claim 1, wherein the control unit controls the wireless unit to operate in the transceive mode if a setting signal is input while the wireless unit is operating in the receive mode.

4. The apparatus according to claim 1, wherein at least one period in a third period is the transmit state in the transceive mode, the third period including an integer multiple of the each period.

5. The apparatus according to claim 1, wherein the wireless unit continuously transmits the connection request for a fourth period which is shorter than the first period, and transmits the connection request every fifth period which is longer than the fourth period and shorter than the first period.

6. The apparatus according to claim 5, wherein the wireless unit continuously receives the connection request for a sixth period which is longer than a period obtained by subtracting the fourth period from the fifth period in the receive state.

7. The apparatus according to claim 6, wherein the wireless unit continuously receives the connection request for the sixth period which is set apart from the middle of the second period in the receive state.

8. The apparatus according to claim 1, further comprising an antenna configured to transceive the connection request.

9. A wireless communication method for a wireless unit of a wireless communication apparatus, the method comprising:
setting a transmit state or a receive state for each period and transmitting or receiving a signal, the transmit state including a first period for transmitting a connection request to establish connection, the receive state including a second period for receiving a connection request, and both lengths of the first period and the second period being equal; and
operating in one of a transmit mode, a receive mode, and a transceive mode, the transmit mode being a mode in which the transmit state is maintained for a plurality of first periods, the receive mode being a mode in which the receive state is maintained for a plurality of second periods, and the transceive mode being a mode in which the transmit state and the receive state are switched,
wherein the operating operates in the receive mode or the transceive mode before a trigger signal is externally input, and operates in the transmit mode if the trigger signal is input.

* * * * *